Oct. 8, 1963   R. HINGST   3,106,192
WASTE HEAT UTILIZATION
Filed May 13, 1960
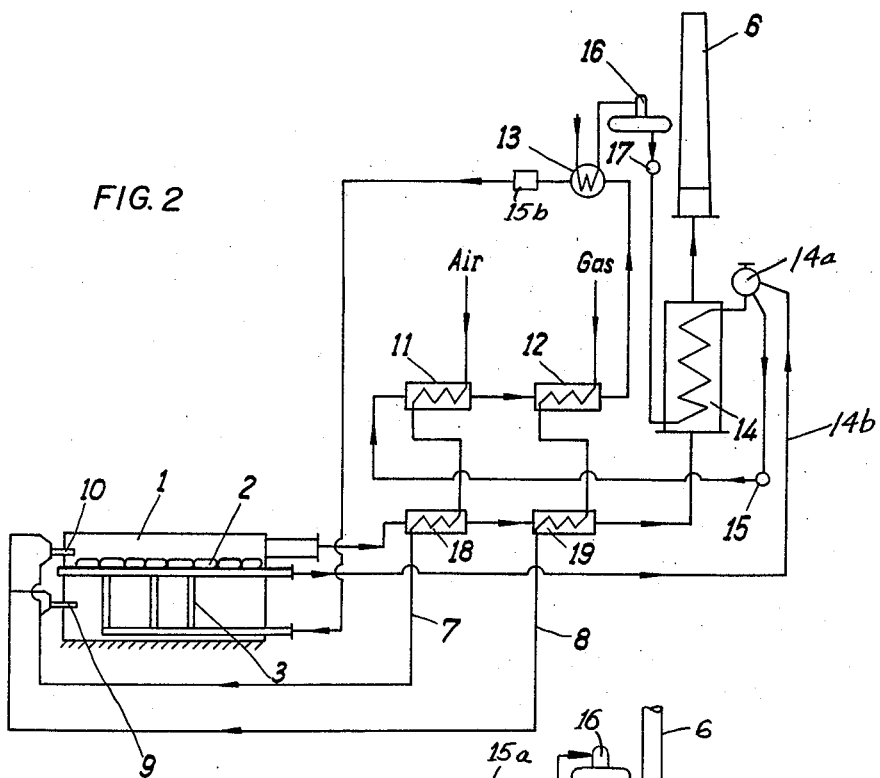
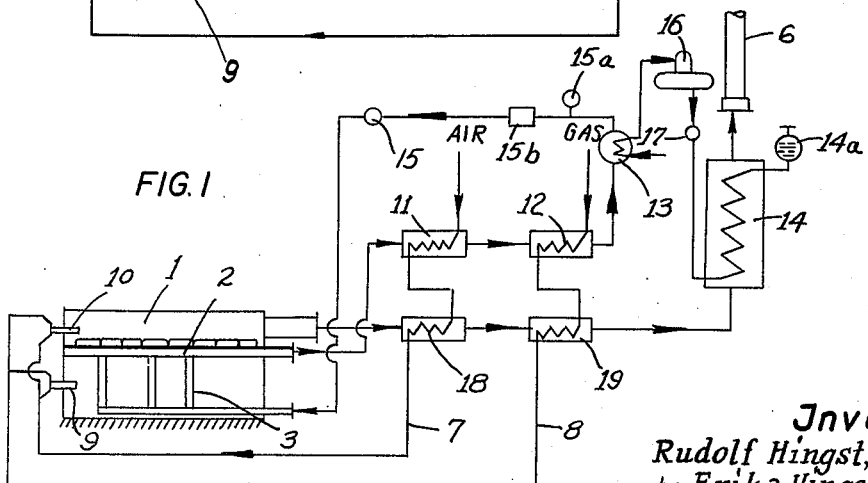
Inventor:
Rudolf Hingst, deceased,
by Erika Hingst, heiress,
By Bailey, Stephens & Huettig
Attorneys

3,106,192
WASTE HEAT UTILIZATION

Rudolf Hingst, deceased, late of Kassel-Wilhelmshohe, Germany, by Erika Hingst, heir and guardian of minor heir, Kassel-Wilhelmshohe, Germany, assignor to Schmidt'sche Heissdampf - Gesellschaft, Kassel - Wilhelmshohe, Germany
Filed May 13, 1960, Ser. No. 30,396
5 Claims. (Cl. 122—7)

The invention relates to waste heat utilization and, in particular, is directed to a method of utilizing the waste heat of forced circulation or water wall furnaces, such as a Siemens-Martin furnace.

According to this invention, the liquid used in the cooling of the water walls and supporting frames of forced circulation furnaces or in the cooling of the door frames in a Siemens-Martin furnace is, after receiving heat from the water walls, then used to transfer its heat in heat exchangers to preheat the combustion air and fuel being sent to the furnace and then the liquid is passed to a waste heat boiler. By using the fluid to preheat the air and fuel being fed to the furnace and then additionally heating the combustion air and fuel by the waste gases from the furnace, the air and fuel are both heated to a higher degree than normal when introduced into the furnace, and the waste gases are discharged from the furnace at a higher temperature so that a greater amount of heat than conventionally obtained is available for recovery in the waste heat boiler.

Prior to this invention, it has been known to use the furnace exhaust gases of furnaces having forced circulation cooling walls by passing the furnace gases in heat exchange for the purpose of preheating the combustion air and furnace fuel.

In comparison with this known heat exchange, the method of this invention provides a more intense utilization of the waste heat from the furnace so that this waste heat is sufficient to generate a satisfactory amount of useful steam in a waste heat boiler in addition to assisting in the preheating of the combustion air and fuel. This increase in the utilization of available heat is accomplished according to this invention by first preheating the air and fuel with the heat acquired from the furnace water walls and then additionally preheating the air and fuel with the discharged exhaust gases from the furnace so that in the heat exchanger the furnace gases are hotter than ordinary and the gases can be transferred from the heat exchanger to the waste heat boiler at a temperature high enough for the generating of useful quantities of steam.

A further increase in the quantity of generated heat is accomplished with advantage by passing the water wall cooling fluid, after it has passed through the first heat exchangers for preheating the combustion air and fuel and before its return to the furnace water walls, through another heat exchanger which preheats the feed water for the waste heat boiler. The amount of steam generated by the waste heat boiler is thereby considerably increased. The heat exchangers for the preheating of the air and fuel and the waste heat feed water may be connected in parallel or in series in the flow path of the water wall cooling agent.

In the forced circulation furnaces or Siemens-Martin furnaces, it is of advantage to insert an air blower or natural chimney draft for cooling the heated surfaces before the cooling agent enters the cooling spaces. This air cooler is for the purpose of adjustably cooling the cooling agent in the event that one of the heat exchangers fails in the cooling circuit. The air exhausted from this air cooler is fed through a special pipe line to the waste heat gas being exhausted through the chimney or, as when the heat exchangers for heating the combustion air fails, is furnished to the furnaces as combustion air.

A further embodiment of the invention resides in that a steam water drum for the waste heat boiler is used as a compensating vessel in the cooling agent circuit for the cooling of the water walls of a forced circulation or a Siemens-Martin furnace. This feature eliminates the compensating vessel which must otherwise be mounted in the cooling circuit, and all heat variations in the cooling agent circuit are compensated by preventing extremes of temperature. If the temperature of the cooling agent should be unduly increased by failure of one of the heat exchangers, the heat of this increased temperature is transmitted by the cooling agent to the waste heat boiler and increases the heat balance thereof. On the other hand, the cooling agent on its return from the steam water drum to the cooling agent circuit always has a uniformly low temperature since the temperature extremes of the cooling agent are cut off as it enters the steam drum.

The means by which the objects of the invention are obtained are described more fully with reference to the accompanying drawings, in which:

FIGURE 1 is a schematic view of a forced circulation furnace with the addition of the utilization of the water wall cooling agent for preheating the combustion air and furnace fuel; and FIGURE 2 is a view similar to FIGURE 1 with the further showing of the steam water drum of the waste heat boiler used as a compensating vessel.

In FIGURE 1, the apparatus for performing the method of this invention is shown. The furnace 1 is provided with headers 2, risers 3, and burners 9 and 10. The cooling agent for the water walls composed of headers 2 and risers 3, after being heated in the water wall, is led through a pipe to a first heat exchanger 11 for preheating the combustion air and then led through a second heat exchanger 12 for preheating the fuel gas or fuel oil as the case may be. From heat exchanger 12, the cooling agent is led through a heat exchanger or economizer 13 for preheating the feed water for the waste heat boiler 14. The cooling agent having given up its acquired heat is then returned to the water walls of furnace 1 by means of pump 15. Between heat exchanger 13 and pump 15 is a compensating vessel 15a connected to the pipe line in a conventional manner. The waste boiler feed water leaving the economizer 13 is led through a degasifier 16 and then through pump 17 into the waste heat boiler 14. With regard to furnace 1, the combustion air, after being preheated in heat exchanger 11, is led through heat exchanger 18 which is heated by the exhaust gases coming from furnace 1. Similarly, the fuel, after being preheated in heat exchanger 12, is further heated by the exhaust furnace gases in heat exchanger 19. The exhaust furnace gases leave heat exchanger 19 at a higher temperature than heretofore and at this higher temperature are passed into the waste heat boiler 14 for the generation of steam.

In order to cool off in a regulatable manner the cooling agent which flows back to the furnace cooling or water walls in the case of a failure of one of the heat exchangers in the cooling agent circuit, an air cooler 15b is inserted in the return line of the cooling agent. Air for operating this cooler is either supplied by a separate blower or drawn through the cooler in a measured quantity by natural draft through the cooler. The air heated in this manner is fed to the furnace waste gases before they enter the chimney or is added to the intake combustion air.

A further feature of the invention is shown in FIGURE 2. In this figure, the ordinarily required compensating vessel 15a of FIGURE 1 is eliminated by utilizing in place thereof the steam water drum 14a of waste heat boiler 14 to effectively prevent the occurrence of temperature extremes. The cooling agent leaving the furnace 1 is passed through pipe line 14b into steam and water drum 14a and then through pump 15 into heat exchangers 11 and 12 and thereby effectively serves for increasing the quantity of useful steam generated in waste heat boiler 14.

Having now described the means by which the objects of the invention are obtained,

The following is claimed:

1. A method of heating a waste heat boiler by utilizing the waste heat of the exhaust furnace gases and of the cooling agent for a forced circulation cooling system for a furnace comprising first preheating the intake combustion air and fuel for the furnace with heat extracted from the cooling agent coming from the furnace while at least partially cooling said agent to a temperature suitable for recycling said agent to said furnace, then further heating the preheated combustion air and fuel with exhaust furnace gases, and then passing the exhaust furnace gases into the waste heat boiler at a temperature suitable for the generation of steam.

2. A method as in claim 1, further comprising preheating the waste heat boiler feed water with the cooling agent first used for preheating the combustion air and fuel for the furnace.

3. A method as in claim 2, said first preheating and said waste heat boiler feed water preheating being connected in a series flow of said cooling agent.

4. A method as in claim 3, further comprising recirculating said cooling agent to said furnace, and air cooling said agent after preheating said waste heat boiler feed water.

5. A method as in claim 1, said waste heat boiler having a steam water drum, and further comprising passing said cooling agent coming from said furnace first through the steam water drum of said waste heat boiler for compensating the temperature of said cooling agent, and then passing said cooling agent to first preheat the combustion air and fuel for said furnace.

References Cited in the file of this patent

UNITED STATES PATENTS

| | | |
|---|---|---|
| 1,975,519 | Rudorff | Oct. 2, 1934 |
| 2,026,339 | Pierce | Dec. 31, 1935 |
| 2,320,821 | Jimenez | June 1, 1943 |
| 2,803,439 | Fikenscher | Aug. 20, 1957 |

FOREIGN PATENTS

| | | |
|---|---|---|
| 269,688 | Great Britain | Apr. 26, 1927 |
| 724,116 | Great Britain | Feb. 16, 1955 |

OTHER REFERENCES

"Waste-Heat Utilization" (Blau). Power, vol. 61, No. 14, published April 7, 1925. Page 552 relied on.